United States Patent [19]

Feres

[11] Patent Number: 4,545,853

[45] Date of Patent: Oct. 8, 1985

[54] FILM EVAPORATORS

[76] Inventor: Vaclav Feres, Haid- und Neu-Strasse 14, D-7500 Karlsruhe 1, Fed. Rep. of Germany

[21] Appl. No.: 573,354

[22] Filed: Jan. 24, 1984

[30] Foreign Application Priority Data

Sep. 10, 1983 [DE] Fed. Rep. of Germany ........ 3332679

[51] Int. Cl.[4] ............................................... B01D 1/22
[52] U.S. Cl. ........................................... 159/7; 202/236
[58] Field of Search .................... 159/7, 8, 9 A, 9 R, 159/10; 202/236; 261/92

[56] References Cited

U.S. PATENT DOCUMENTS

| 1,250,427 | 12/1917 | Campbell | 159/8 |
| 2,033,215 | 3/1936 | Whitmore | 159/7 |
| 2,275,117 | 3/1942 | Vogel-Jorgensen | 159/8 |
| 2,601,600 | 6/1952 | De Witt | 261/92 |
| 3,960,991 | 6/1976 | Schmitt et al. | 261/92 |
| 4,167,454 | 9/1979 | Feres | . |
| 4,255,232 | 3/1981 | Ries | 159/8 |
| 4,339,398 | 7/1982 | Feres | . |

FOREIGN PATENT DOCUMENTS 2510206 3/1975 Fed. Rep. of Germany .

Primary Examiner—Barry S. Richman
Assistant Examiner—John Donofrio
Attorney, Agent, or Firm—McCormick, Paulding & Huber

[57] ABSTRACT

A film evaporator is made up of a central shaft with conical surface elements fixed on it, each of which has a conically convex side and a conically concave side, said conical surface elements walling off an evaporation space. There is a means for running a product feed to limits of inner openings in the rotating conical surface elements so that same may be spread out from said limits in the form of a film and after heating by said heat vehicle may be run off out of the evaporator as a concentrate. The outer faces of the surface elements are heated by a heat vehicle. To make certain that the film of product is kept unbroken on its way through the apparatus there are tubelets with a small diameter running out radially from the outer limits of the surface elements. At their inner limits the tubelets each have an inner diameter such that the sum of the inner circumferences of all the tubelets on a given surface element is equal to the circumference of the surface element in question at its outer limit.

This design makes it possible for the evaporation area of a given amount of film to be kept the same as the film is moved from the ends of the tubelets that are joined with the surface element to the outlets thereof so that there is no chance of the film being broken as it makes its way through the tubelets.

14 Claims, 5 Drawing Figures

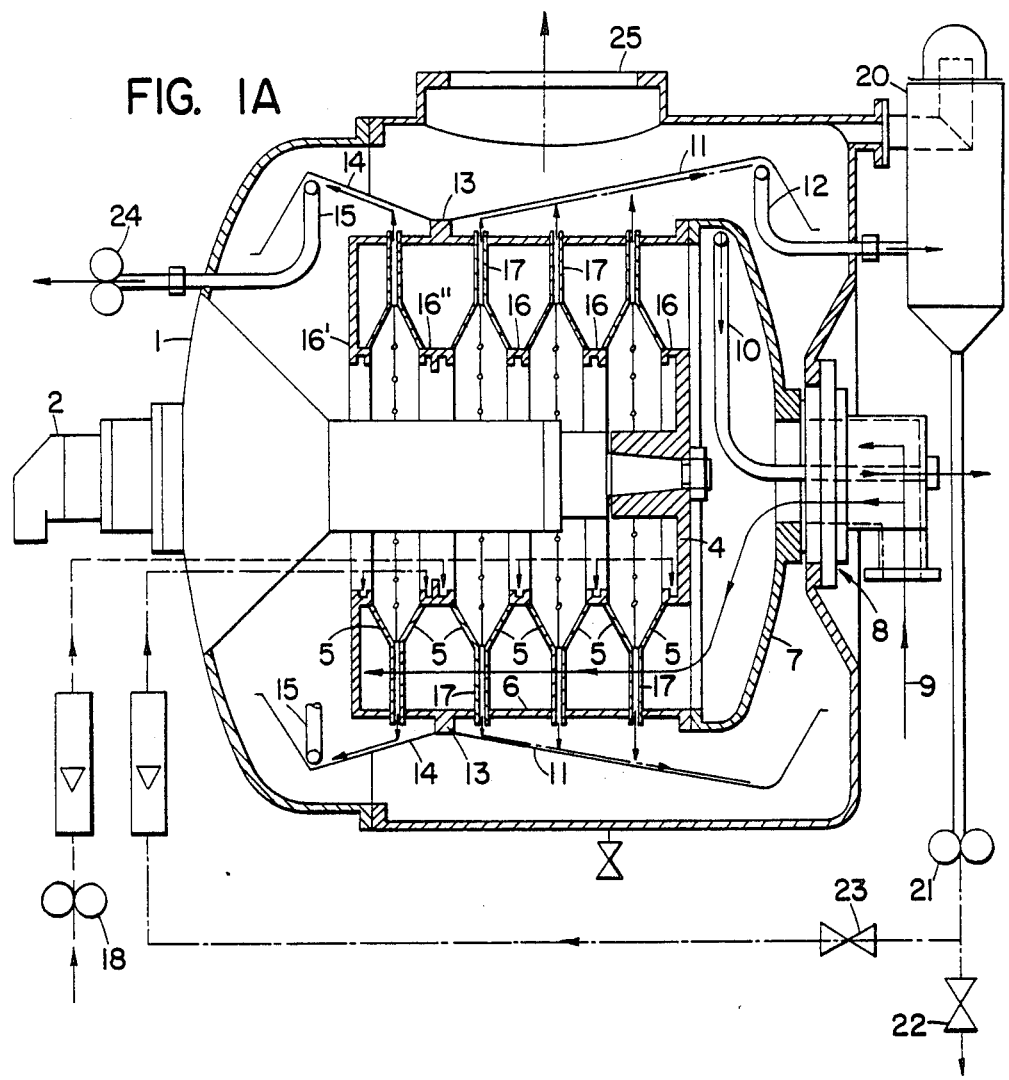
FIG. IA
FIG. 3
FIG. 4

FILM EVAPORATORS

BACKGROUND OF THE INVENTION

The present invention is with respect to film evaporators and more specially to such an evaporator made up of a central turning driving shaft, spaced conical surface elements joined to said driving shaft with an evaporation space within them and a heat vehicle space placed round said evaporation space on the outside of the surface elements, the product being run into the evaporator at inner edges of the conical surface elements so that it is then spread out in the form of a film and is run off from the evaporator after being heated by the heat vehicle.

A number of different designs of film evaporators using turning conical evaporation surface elements are to be seen in the German Offenlegungsschrift specifications Nos. 2,510,206, 2,603,480, and 2,951,689. Such evaporators outdo other designs inasfar as the product is spread out into a thin, film-like layer so that, more specially when the evaporator is run under vacuum, chemical, pharmaceutical and foodstuff products may be concentrated within a short residence time and liquids driven off therefrom with a minimum of undesired effects on product quality. In the known designs there is a single conical evaporation surface of the desired size, or there may be a battery of evaporation elements placed one after the other on the driving shaft so that there is an increase in the evaporation rate.

In the case of such evaporators the speed of turning the shaft, the rate of feed of the product into the apparatus and the temperature gradient on the evaporator surface have to be in so controlled and have such a relation to each other that a full and unbroken film is kept up all over the evaporation surface. To keep up such an unbroken film, the film thickness then has to be markedly greater where the material is run into the apparatus at the inner edge of the evaporation face than further out, because the evaporation area of a given amount of film becomes greater with the square of its distance from the center of the shaft. Under likely working conditions it is frequently not possible to keep to this condition, more specially because the system is highly sensitive to changes in the viscosity and the surface tension of product and furthermore to the concentration ratio (condensing ratio). Once there is a break in the film, the bare evaporation surface is likely to be overheated at this point with the outcome that the product may be denatured. Incrustations may be formed or the rate of evaporation may go down. This danger is more specially great in the case of heavy concentration of weak solutions and of distilling solutions, with a low impurity concentration, of organic substances of synthetic or natural origin.

SHORT OUTLINE OF THE PRESENT INVENTION

One purpose of the present invention is that of making a better design of a film evaporator of the sort in question so that the danger of the product layer being broken is put an end to, even if the layer is very thin.

For effecting this and further purposes that will become clear on further reading of the present specification, the outer limit of each conical surface element is beset with spaced tubelets having a small inner diameter, such tubelets running radially through the heat vehicle space, and the inner wall face thereof being joined to the conical surface of the said element and being of such a size that the sum of the circumference of such tubelets is materially equal to the circumference of the surface element to which they are fixed.

It will be seen from this that in the case of the film evaporator in keeping with the present invention the evaporation surface is made up of a conical section as has been used in prior art evaporators, and capillary tubelets next thereto. Because the sum of the inner circumferences of all the tubelets is more or less equal to the outer circumferene of the conical surface at the roots of the tubelets, the area of a given amount of film undergoing evaporation will keep at more or less the same value from the bases of the tubelets as far as their radially outer ends. This makes certain that the film building up on the conical surface is kept in existence and unbroken as far as the outlet of the evaporator so that under normal working conditions there are no troubles as might otherwise be caused by the film being broken. Parallel with this, the film or layer thickness may be cut down in case of need so that the heat transfer becomes better, the rate of evaporation is stepped up and the product residence time may be decreased.

In keeping with one working example of the present invention the conical surfaces may be more importantly used for causing distribution of the product and not be placed running into the heat vehicle space or they may be only in it partly. It will be seen that in this form of the invention the greater part of the evaporation surface is in the tubelets, whereas the conical surface has as its most important function the spreading of the feed product to get it into the form of a film. As a side-effect there is naturally a first stage of evaporation on this conical face, the rate of evaporation here being dependent on the degree (if any) to which the conical face is within in the heat vehicle space and so has its outer face in contact with the heat vehicle.

In a preferrd form of the invention in each case a pair of conical surface elements are put together with the tubelets running out from the join between them at their outer edges, and the input of product is at the edge of inner concentric openings of such paired conical surface elements. The product is then spread out radially from the opening edge towards the tubelets as a layer or film.

The tubelets are best made in a cylindrical form, although however if necessary they may become narrower in an outward direction conically so that the evaporation area of a given amount of film will be decreased somewhat on its way outwards through one of the tubelets and even at a high rate of evaporation within the tubelets the film of product is kept in a complete and unbroken condition.

The evaporation surface elements designed in keeping with the present invention may be manufactured in a number of different ways. To take one example, the starting point may be a round sheet metal blank, into which wedge-like cutouts are stamped starting from the outer edge of the blank and running in a radial direction. The strips of sheet metal still in existence between the cutouts are then rolled up about their radial axes for forming the tubelets. The other conical surface elements of a pair of elements, facing in the opposite direction, whose outer diameter is smaller than the first sheet metal blank noted by the length of two tubelets, is mounted on the evaporation surface element with the tubelets and joined at the outer edge thereto.

In place of this method of manufacture, it is furthermore possible for ready-made cylindrical or conical tubelets to be used, that are then placed in ports at the joined outer edges of the conical surface elements.

This working form of the invention is rewarding inasfar as the tubelets may readily be replaced and if desired they may be made with a different size and in a different material without the material of the surface elements having to be changed. To take an example on this point, they may be made of a heat resistant synthetic resin as for example PTFE. It is furthermore to be noted in this connection that this form of the invention makes it possible for the tubelets to be made with a lesser wall thickness than the conical part of the evaporation surface element. There is then a representative increase in the heat transfer coefficient at the tubelets. The lower wall thickness is furthermore possible because the tubelets themselves are more resistant to pressure than the conical surface element. It then becomes possible to have heat transfer coefficients between 6000 and 10000 kcal/squ.mh° C. without experiencing any troubles in operation. Seeing that evaporation takes place on the conical evaporation surface element, this vapor will in part be pushed through the tubelets as well by centrifugal force, while on their surfaces one may be certain of an even distribution of the product as a film so that right from the very start there will be two-phase flow. Lastly, an evaporator designed like this and with the input of product at the inner limit of the conical section of the evaporator surface element may be run with a lower layer thickness than would be the case with a conical evaporation surface element running out as far as the outside.

The tubelets to be used in the present invention furthermore make it possible for the residence time to be stepped up by placing helical wires in the tubelets, the diameter of the outsides of the wires being equal to the inner diameter of the tubelets, or by producing the tubelets with a helical ridge at least on their inner faces. In this case the film of product will be forced to go along helical or coiled paths so that the residence time will be increased. A further effect here will be that the thickness of the film on the evaporation surface will become greater, the increase being dependent on the inner diameter of the helical ridge or wire.

In tests run under working conditions the sizes of the tubelets turning out to be more specially of value were those with an inner diameter of 5 to 7 mm, a wall thickness of 0.3 to 0.5 mm and a length of 120 to 500 mm.

In keeping with a further preferred from of the invention the tubelets running through the heat vehicle space have their free ends running through a cylinder walling in such space, the tubelets opening into a concentrate header space, that is placed round the outside of the heat vehicle space. This concentrate header space may be walled in and defined by a simple conical fixed to the heat vehicle space so that it is turned therewith and with the evaporation surface elements. At the point where the casing has its greatest diameter the product is run off by the use of a scoop tube.

Furthermore it is possible as part of the invention for each part of conical surface elements to have such a conical form that they become wider in an outer direction and may be fixed on their insides on a support ring, that is placed round and at some distance from the driving shaft, it forming an inwardly opening U-like trough, into which the product is run as it comes into the apparatus, the product then flowing over the edge of the trough and running onto the evaporation surface elements. The space between the support rings and the driving shaft, and the concentrate header space as well, may be used as an outlet for the vapor that is produced in the apparatus. The support rings themselves have the function of strengthening the inner limit of the conical surface elements so that even with their low wall thickness the structure is strong enough for the desired purpose and more specially a number of conical surfaces may be placed one after the other as a compound structure.

A more detailed account of the invention will now be presented that is based on one working example to be seen in the figures herein.

LIST OF THE DIFFERENT VIEWS OF THE FIGURES

FIG. 1A is a vertical section through a two-stage example of the invention also in the form of a film evaporator, with the same reference numerals being used to indicate parts common to both working examples.

FIG. 3 is a sectional view taken generally on the line 3—3 of FIG. 2 and

FIG. 4 is a sectional view taken generally on the line 4—4 of FIG. 2.

DETAILED ACCOUNT OF THE WORKING EXAMPLE OF THE INVENTION

Figure 1:
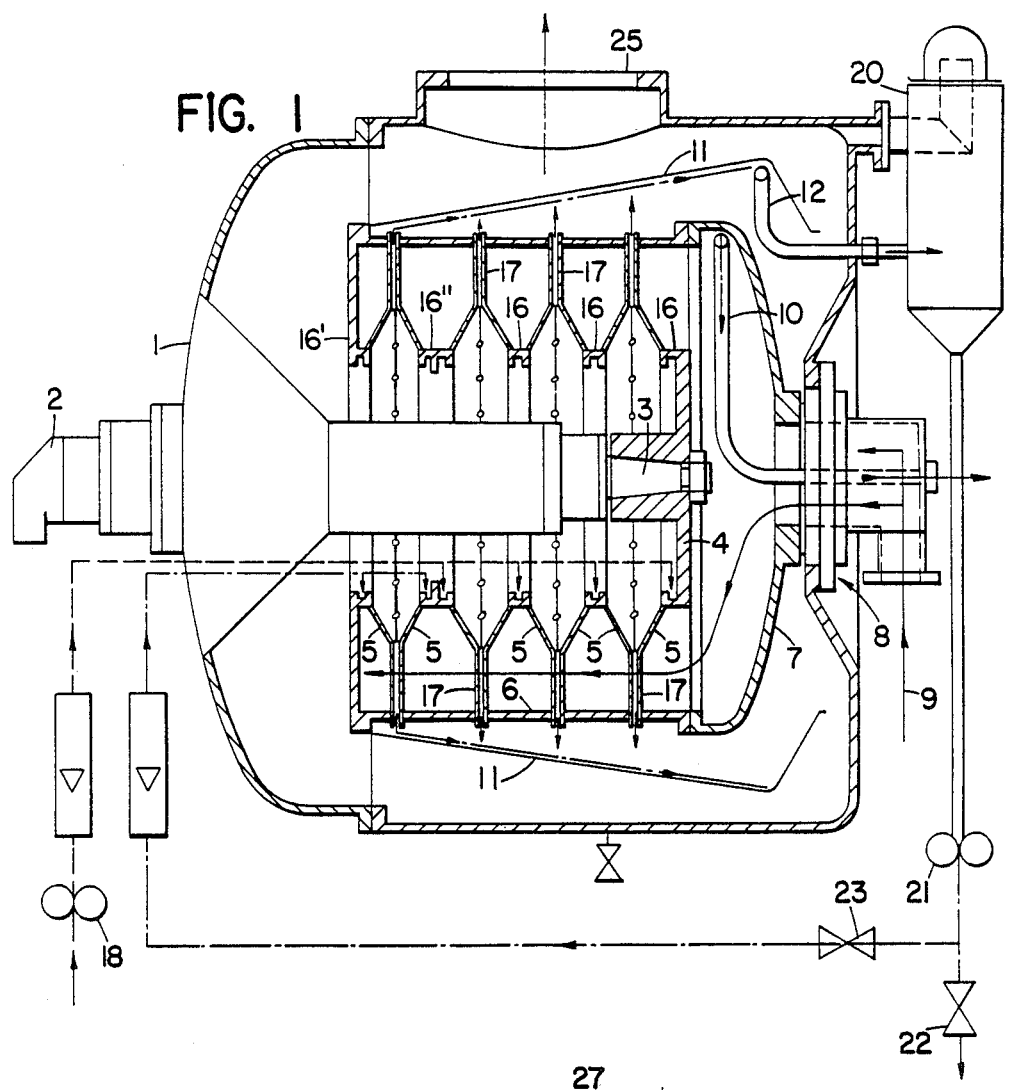
FIG. 1 is a vertical section taken through a single stage example of the invention.

The film evaporator to be seen in FIG. 1 has a housing 1, with a hydraulic drive motor 2 place on one end thereof for driving a shaft. By way of a supporting wheel 4 a number of conical surface elements 5 are mounted along and on the driving shaft one after the other. The surface elements 5 are placed within a cylinder 6 that is turned with the elements 5. The end plate or wall 7 on the right end of the cylinder 6 is joined up by way of a glanded connection head 8 in the housing 1 with certain stationary ducts with functions to be noted hereinafter. The space formed between the outer side of the surface elements 5 and the cylinder 6 is used to take up a vapor heat vehicle which is guided therein and which comes into this space by way of the glanded connection head 8 as the direction is marked by the arrow 9, whereas the condensate is let off from through the wall 7 near its outer limit by way of a single scoop tube 10 in the top figure half.

For collecting the concentrated product so that it may be taken up by the one or more scoop tubes 12 there is on the outside of the cylinder 6 (walling in the heat vehicle space) a casing 11 that in the lower part of FIG. 1 will be seen to become wider from the left hand end of the cylinder 6 to the right hand end thereof where the single scoop tube 12 is placed, whereas in the FIG. 1A, in which the apparatus is designed for two-stage operation, the casing has a waist about one quarter of the distance from its left hand end and becomes wider conically in both directions therefrom to the said scoop tube 12 and to a further scoop tube 15 at the left hand end. The casing 11 is as well turned with the driving shaft 3. In the case of the form of the invention to be seen in the top part of the FIG. 1 the conical casing 11 is fixed in position at 13 (between the last and the lastbut-one evaporation surface element) to the outer side of the cylinder 6.

As the reader will be able to see from FIG. 1 and FIG. 1A two conical evaporation surface elements 5 are placed opposite to each other in separate pairs. There inner limits are in each case fixed on a support ring 16, that has an inwardly opening U groove. To put it differently, the support rings 16 are in the form of troughs with their inner trough spaces opening towards the axis of the structure. The conical evaporation or surface elements are designed running outwards and away from each other from the common troughs and at their outer limit take the form capillary tubelets 17. The tubelets 17 have their free ends let into the wall of the cylinder 6 walling in the heat vehicle space, the outer ends of the tubelets opening into the space between the cylinder 6 and the casing (with a single part 11 in the case of the lower part of FIG. 1, or with two parts 11 and 14 in the case of the top part thereof as shown in FIG. 1A). The product that is to be concentrated is run into the evaporator by a pump 18, the pump having a duct running therefrom into the space between the driving shaft 3 and the support rings 16. At each trough-like support ring 16 the duct 19 has an outlet so that the product may be squirted or injected into the trough space. From this position the product then makes it way over the two opposite edges of the trough space onto the evaporator surface elements 5 at their inner limits. Because the system is turning, the product is spread out in the form of a layer moving outwards on the surface elements 5 till it is taken up in the radially inner ends of the tubelets 17. The concentrated product comes out of the tubelets 17 and is slung or splashed against the casing 11, 11 by the centrifugal force (and against the casing 11 and 14 in FIG. 1A). Because of the conical design of the casing, the product is moved along the part 11 into the part of the casing with the greatest diameter to be stripped therefrom by the scoop tube 12. The concentrated product then goes into a separator 20, in which it is freed of vapor and—in the case of a single stage set-up FIG. 1—it is run off by a pump 21 through an opened valve 22. In the case of a two-stage set-up FIG. 1A the product, after undergoing one stage of concentration, is forced by the pump 21 through the opened valve 23 (the valve 22 is this time shut) into the space next to the outer evaporation surface element and run onto the support rings 16' and 16". Lastly it comes out through the outer tubelets 17 (to be seen furthest to the left in the FIG 1). In the case of continuous two-stage operation (FIG. 1A) the end concentrate is stripped by the scoop tube 15 at the left hand end of the casing part 14 and run off by the pump 24. The vapor given off by the product is let out through the connector 25 from the evaporator.

Figure 2:
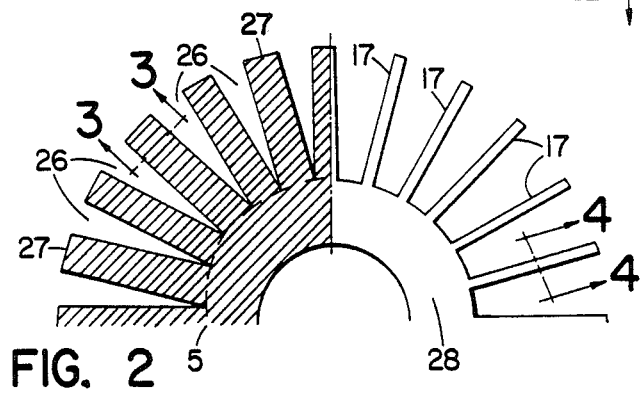
FIG. 2 is a view of stages in the production of tubelets on a surface element, such tubelets being seen as-cut in the left hand side of the figure and after rolling up on the right hand side.

In FIG. 2 the reader will see an example for the production of the evaporator surface elements. In this case wedge-like or narrowing cutouts 26 running in a radial direction are stamped from a round sheet metal blank so that there are then spoke-like sheet strips 27 between such cutouts. These metal strips are then bent and rolled up about their radial axes to make the cylindrical or coned tubelets 17. Furthermore the inner section 28 is bent into a conical form. And a further conical section, dished in the opposite direction, is then placed on the section 28 and joined thereto along the outer edges, that is to say between the tubelets 17 and their bases at the points at which the inner ends of the tubelets are joined with the inner section 28 of the evaporator surface element as noted hereinbefore. In place of this design it is furthermore possible for only two coned sections 28 to be placed opposite to each other and for them to have openings at their outer edge so that ready-made tubelets 17 may be plugged into such openings.

In the working examples to be seen in FIG. 1 and FIG. 1A the coned surface elements have the heat vehicle flowing round all sides thereof so that a complete or high-efficiency evaporator surface is formed. In place of this however the system may be so designed that they are acted upon by the heat vehicle only partly or not at all so that first-stage or pre-evaporation takes place. In this case the conical surface elements 5 have as their main function the distribution of the product and causing a film or layer to be formed.

I claim:

1. A film evaporator comprising a support, a shaft supported in said support for rotation on an axis of said shaft, a plurality of frustoconical surface elements fixed in axially spaced relationship on said shaft, each said frustoconical surface element forming a closed tapered surface around said shaft axis and being arranged in opposed paired relationship with an adjacent such frustoconical surface element, each such paired set of frustoconical surface elements being provided in spaced relationship from each other along said shaft, said frustoconical surface element sets cooperating with each other to define a convex outer side and a complementary concave inner radial side, said frustoconical surface elements as so arranged defining an inner evaporation space, cylinder means cooperating with said outer sides of frustoconical surface elements and defining an annular heat vehicle space outside of said evaporation space, means for running a product feed to said inner sides of said frustoconical surface elements so that the product may be spread out in the form of a film, means for introducing a heated vehicle to said annular space such that said heat vehicle is collected on the inside of said cylinder means, means for removing heat vehicle condensate, circumaxially spaced radial tubelets fixed to said frustoconical surface elements at radially inner bases of said tubelets, said tubelets having small inside diameters and running through said annular heat vehicle space, the sum of the circumferences of said tubelets at said bases thereof on one such frustoconical surface element set being materially equal to the circumferential length of the outer limit of said frustoconical surface element set on which said tubelets are fixed.

2. The film evaporator as claimed in claim 1 wherein said frustoconical surface elements are designed and placed mainly for causing distribution of the product and are at the most only positioned to a small degree in said heat vehicle space.

3. The film evaporator as claimed in claim 1 wherein said tubelets become narrower in a radially outward direction conically.

4. The film evaporator as claimed in claim 1 wherein said frustoconical surface elements with said tubelets thereon are formed from an initially flat sheet metal blank, said tubelets being formed by radially extending strips running from an outer edge of said blank towards a middle point thereof, and an annular inner portion of said blank being so formed as to define said frustoconical surface elements.

5. The film evaporator as claimed in claim 1 comprising helical wire elements in said tubelets with an outer diameter the same as the inner diameter of the tubelets.

6. The film evaporator as claimed in claim 1 wherein at least on inner sides thereof said tubelets have helical ridges for causing a helical flow of said product therethrough.

7. The film evaporator as claimed in claim 1 wherein said tubelets have an inner diameter of materially 5 mm, a wall thickness of materially 0.3 to 0.5 mm and a length of materially 120 to 150 mm.

8. The film evaporator as claimed in claim 1 wherein said tubelets are placed running through said heat vehicle space, said evaporator further comprising an outer cylindrical wall to said heat vehicle space with said tubelets running therethrough and further a casing outside said elements and forming an outer wall to said heat vehicle space on the one hand and on the other hand forming a guide wall for collecting product coming out from radially outer ends of said tubelets.

9. The film evaporator as claimed in claim 1 wherein frustoconical surface elements are placed together in pairs so as to have, in any one such pair, their conically concave sides facing each other and having outer edges thereof joined together at radially outer joint, such tubelets being placed radially and running out from said joint so as to be in connection with a space within two said elements of said pair, said evaporator further comprising means for supply of said feed to inner limits of at least two of said surface elements that have their convex sides thereof turned towards each other.

10. The film evaporator as claimed in claim 9 comprising support rings for joining said shaft with said inner limits of said conical surface elements as placed in pairs, said inner limits being clear of said driving shaft, said rings forming inwardly opening troughs, and means for flowing said product into said troughs centrifugally filling same so that said product is overflowed over said limits and makes its way outwards on faces of said surface elements.

11. The film evaporator as claimed in claim 9 wherein said tubelets are ready-made tubelets that are fixed in position at said joints.

12. The film evaporator as claimed in claim 11 wherein said tubelets have a wall thickness that is less than the thickness of the said conical surface elements.

13. The film evaporator as claimed in claim 11 wherein said tubelets are made of a heat resistant synthetic resin.

14. The film evaporator as claimed in claim 13 wherein said tubelets are made of PTFE.

* * * * *